UNITED STATES PATENT OFFICE.

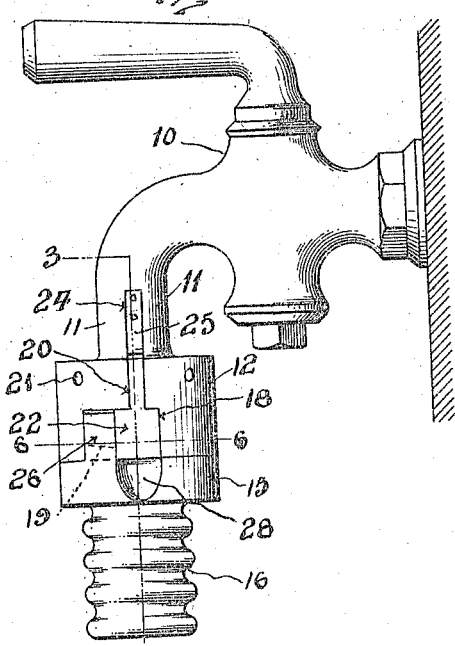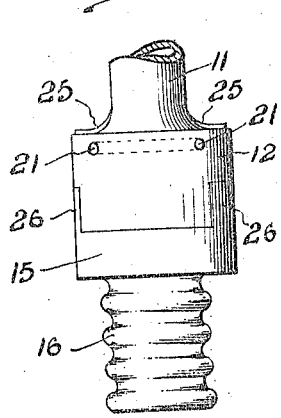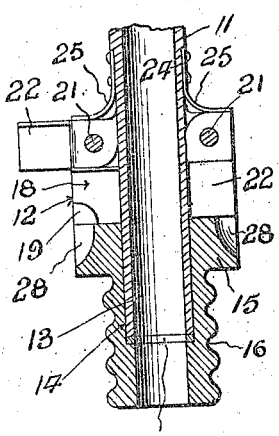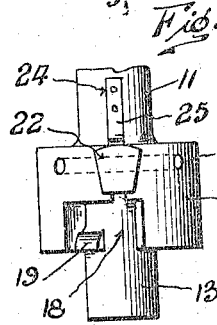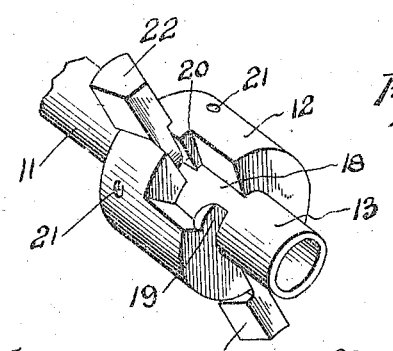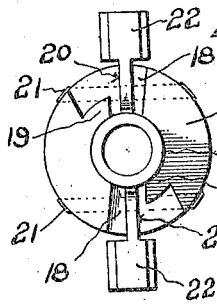

ALFRED C. BUTCHER, OF STAATSBURG, NEW YORK.

HOSE CONNECTION.

1,233,750.  Specification of Letters Patent.  Patented July 17, 1917.

Application filed February 25, 1916. Serial No. 80,426.

*To all whom it may concern:*

Be it known that I, ALFRED C. BUTCHER, a citizen of the United States, residing at Staatsburg-on-Hudson, in the county of Dutchess and State of New York, have invented certain new and useful Improvements in Hose Connections, of which the following is a specification.

This invention relates to improvements in coupling devices, more particularly to devices for the quick coupling of hose, either two sections of hose or a section of hose to a fixed device, such as a faucet, and which may likewise be employed without material structural change for coupling two sections of pipe.

The device has for one of its objects to simplify and improve the construction and increase the efficiency, utility and security of devices of this character.

With these and other objects in view, the invention consists in certain novel features of construction as hereinafter shown and described and then specifically pointed out in the claims; and in the drawings illustrative of the preferred embodiment of the invention—

Figure 1 is a side view of the improved device shown attached to a faucet;

Fig. 2 is a front elevation of the device;

Fig. 3 is a vertical section on the line 3—3 of Fig. 1;

Fig. 4 is a front elevation of the receiving portion of the improved device with one of the locking members in open position;

Fig. 5 is a bottom plan view of the parts shown in Fig. 4 with the locking members in open position;

Fig. 6 is a transverse section on the line 6—6 of Fig. 1;

Fig. 7 is a detached perspective view of the receiving portion of the improved device;

Fig. 8 is a perspective view of the entering portion of the improved device.

Corresponding and like parts are referred to in the following description and indicated in all the views of the drawings by the same reference characters.

The improved device may be employed in connection with a faucet or other stationary source of supply, or employed for coupling two sections of hose or coupling two sections of piping, it is not desired therefore, to limit the invention in this respect, but for the purpose of illustration the improved device is shown associated with a faucet, and in Fig. 1 the faucet is represented as a whole at 10 and including a discharge terminal 11. Formed integral with the terminal of the faucet is a laterally enlarged head 12 reduced at its outer end, as shown at 13, to enter a socket 14 in another laterally enlarged head 15, the latter being provided with a hose receiving extension 16 of the usual form, the hose not being shown, as it forms no part of the present invention. The reduced portion 13 of the member 12 fits closely within the socket 14 and the confronting faces of the members 12—15 are ground to engage water-tight when the parts are united. The socket 15 may likewise be provided with a suitable packing, represented at 17 in Fig. 3. Formed in the outer end of the enlargement 12 are cavities 18, preferably at opposite sides of the enlargement with the bottoms of the cavities in alinement with the outer face of the reduced portion 13, as shown in Fig. 7. Projecting into each of the cavities 18 is a lug 19 which is integral with the enlargement 12 and its reduced portion 13 with the outer face of the lug in transverse alinement with the outer face of the enlargement, while its inner or rear face extends obliquely to the longitudinal axis of the enlargement. The lug is of less height than the depth of the cavity 18, as illustrated in Figs. 3, 5 and 7.

Formed in the enlarged portion 12 are longitudinally directed slots 20 which communicate at their inner ends, respectively, with the cavities 18, and pivoted at 21 within the slots are locking members or bolts with their inner ends reduced to engage in the slots and their outer ends 22 formed with converging sides, the object to be hereafter explained. Formed in the outer face of the portion 11 of the faucet are seats, represented at 24, to receive springs 25, the springs being bent outwardly to engage against the reduced portion of the locking members 22 and thus maintain them yieldably in closed position, as shown at the right in Fig. 3, and likewise operating to hold the locking members yieldably in open position, as shown at the left in Fig. 3.

Projecting from the outer end of the head or enlargement 15 are lugs 26 having their outer ends directed inwardly or toward each other, as shown at 27. The studs 26—27 are so arranged that when the reduced portion 13 is entered into the socket 14 the studs enter the portions of the recesses 18 at the side opposite to the projections 19 and when the studs have been fully entered with the confronting faces of the portions 12—15 in contact, the member 15 together with the hose attached thereto, is rotated toward the projections 19 until the inwardly directed portions 27 of the studs enter the space in the rear of the lugs 19, the rear inclined faces of the lugs coöperating with the adjacent faces of the projections 27 of the studs to draw the member 15 forcibly toward and in contact with the portion 12. The locking members 22 are then turned downwardly upon their pivots until their converging sides bear respectively against one wall of the recesses 18 and the inner wall of the studs 26—27, as illustrated in Fig. 6. It will be noted that the converging faces of the members 22 closely engage the adjacent faces of the cavities 18 and the member 26, and thus produce a wedging action to firmly bind the members 26—27 in engagement with the member 12, the lugs 19 serving to effectually prevent the withdrawal of the member 15 from its engagement with the member 12. In other words, the members 12—15 are firmly locked in close engagement. The springs 25, as before stated, operate to hold the members 22 yieldably in closed position, but no movement of the members 12—15 will produce any loosening effect between the parts. The coupling members can be disconnected only by manually releasing the locking members 22. Formed in the outer face of the member 15 adjacent to the lugs 26 are depressions 28, to receive the thumb of the operator to enable the members 22 to be more readily released. The outer portions of the members 12—15 are rounded, as shown, and the outer faces of the members 22 are curved to conform to the rotundity of the member 12, so that no abrupt projections occur to come in contact with the surrounding objects. Thus no danger exists of the accidental displacement or the release of the members 22.

The improved device may be embodied in faucets and like devices of various sizes and forms, and likewise employed for coupling hose or pipes, as before stated.

When employed for coupling two sections of hose together, which are liable to be drawn over the ground when in use, the absence of projections is a great advantage, as under those circumstances the members 22 will not be liable to be accidentally released by coming in contact with surrounding objects.

Having thus described the invention, what is claimed as new is:—

1. In a coupling device, coacting tubular members, one having longitudinally extending abutments spaced apart and transversely directed lugs having one face directed obliquely to the confronting faces of the abutments and the other coacting member having longitudinally disposed locking studs with their terminals directed radially of the tubular member and beveled to engage the obliquely directed faces of the lugs, and locking devices having converging sides and mounted to swing externally of the first mentioned tubular member and adapted to bear between the abutments at one side and the locking devices and hold the coacting members in coupled relation and draw them into close contact.

2. In a coupling device, coacting tubular members, each laterally enlarged and one having a socket and the other reduced to enter the socket, the enlargements bearing face to face, one of said coacting members having cavities in its enlargement with the sides of the cavities constituting confronting abutments and each cavity provided with a transversely disposed lug with its inner face directed obliquely to the longitudinal axis of the member, the enlargement of the other coacting member having longitudinally directed locking studs with their terminals directed radially of the tubular members and beveled to engage the obliquely directed faces of the lugs, and locking devices having converging sides and adapted to bear between the abutments at one side and the locking devices and hold the coacting members in coupled relation and draw the faces of the enlargements into close contact.

In testimony whereof I affix my signature.

ALFRED C. BUTCHER. [L. S.]

Copies of this patent may be obtained for five cents each, by addressing the "Commissioner of Patents, Washington, D. C."